(No Model.)
P. S. CRISWELL.
BRAKE SHOE.
No. 455,033. Patented June 30, 1891.
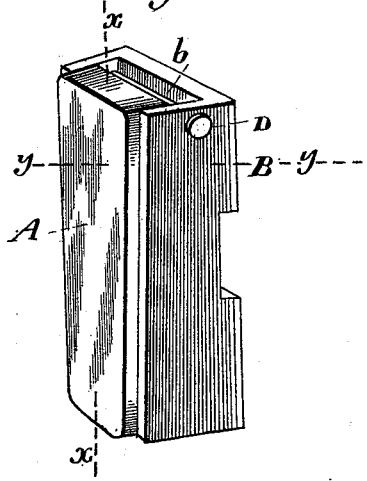
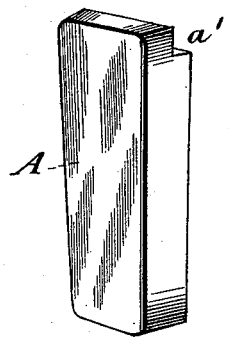
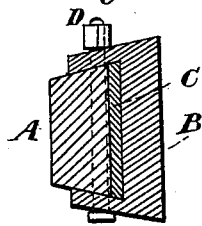
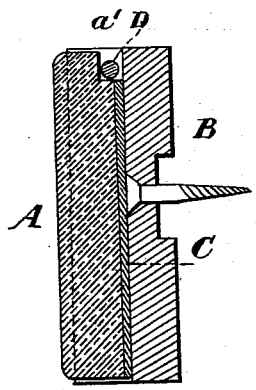
Witnesses.
A. Ruppert,
G. B. Towles.
Inventor.
Peter S. Criswell,
Per
Thomas P. Simpson
Atty.

UNITED STATES PATENT OFFICE.

PETER SHIMER CRISWELL, OF WHEELING, WEST VIRGINIA.

BRAKE-SHOE.

SPECIFICATION forming part of Letters Patent No. 455,033, dated June 30, 1891.

Application filed January 3, 1891. Serial No. 376,623. (No model.)

*To all whom it may concern:*

Be it known that I, PETER SHIMER CRISWELL, a citizen of the United States, residing at Wheeling, in the county of Ohio and State of West Virginia, have invented certain new and useful Improvements in Brake-Shoes for Cars and other Vehicles; and I do hereby declare the following to be a full, clear, and exact description of the invention, such as will enable others skilled in the art to which it appertains to make and use the same.

The special object of this invention is to make brake-shoes so that they will not wear so rapidly as wood, or metal, or rubber, or asbestus, which have been heretofore used. For this purpose I have experimented and have discovered that a shoe made of glass or faced therewith will greatly outwear those made of any material hitherto used for the purpose.

Figure 1 of the drawings represents my invention in its holder in perspective; Fig. 2, a detail view of a preferred form of shoe; and Fig. 3, a section on dotted line $x\,x$ of Fig. 1, showing the glass backed by rubber or some elastic material. Fig. 4 is a cross-section of Fig. 1 on dotted lines $y\,y$.

In the drawings, A represents the shoe made of glass, B the holder, and C the rubber or other elastic block which I arrange between the glass and the holder, which may be made of wood or other material.

The shoe is made to taper longitudinally and is beveled on each side, so as to wedge tightly into the holder B, which is correspondingly constructed on the interior $b$. The shoe A is also notched at $a'$, and across through this notch and the sides of the holder B passes the screw-bolt D, on which fits a suitable nut to hold the bolt securely in position. The shoe A is thus held in a tightly-wedged condition all the time.

The advantages of glass as a material for brake shoes are that it is much more durable than those which have been heretofore made of wood, metal, asbestus, or compressed paper, as it is not abraded and worn off by friction like other known materials for the purpose; secondly, being molded to any form or size it is cheap and easily made to fit any required or preferred holder; thirdly, having no pores or grain it is not liable to crack or split; fourthly, being a non-combustible substance it is not injured by the frictional heat, and, fifthly, it does not expand or contract under the influence of heat or moisture. Being solid, without grain and not porous, it is a harder substance than any of those heretofore used for brake-shoes. Hence it always wears smooth without heating or cutting like metallic brake-shoes, while it will outwear three wooden shoes. Compressed paper and asbestus are soft like wood, and therefore cut, heat, and wear out much more quickly. In view of all these facts, which have been corroborated by practical tests, it seems to be the best substance which can be employed for the purpose.

Having thus described all that is necessary to a full understanding of my invention, what I claim as new, and desire to protect by Letters Patent, is—

1. A brake-shoe for wheeled vehicles, made of glass, as and for the purpose described.

2. The combination of a brake-shoe made of glass, its holder, and an intermediate elastic block, as and for the purpose set forth.

3. The brake-shoe A, tapered in form longitudinally and notched at $a'$ to adapt it to be held, as described.

4. A glass brake-shoe wedge in a holder and backed by the rubber C, as shown and described.

In testimony whereof I have affixed my signature in presence of two witnesses.

PETER SHIMER CRISWELL.

Witnesses:
 WILIE KEENCIN,
 GUSTAV BUTTGEREIT.